United States Patent [19]

Weber et al.

[11] 4,422,846
[45] Dec. 27, 1983

[54] METHOD AND APPARATUS FOR INDIRECTLY DRYING AND PREHEATING FINE MATERIAL

[75] Inventors: Heinrich Weber, Recklinghausen; Kurt Lorenz, Hattingen; Horst Dungs, Herne, all of Fed. Rep. of Germany

[73] Assignee: Firma Carl Still GmbH & Co. KG, Japan

[21] Appl. No.: 394,838

[22] Filed: Jul. 2, 1982

Related U.S. Application Data

[62] Division of Ser. No. 295,496, Aug. 24, 1981, Pat. No. 4,392,823.

[30] Foreign Application Priority Data

Sep. 17, 1980 [DE] Fed. Rep. of Germany ....... 3034952

[51] Int. Cl.³ ............................ F26B 9/12; F27B 7/10
[52] U.S. Cl. ..................................... 432/18; 432/107; 432/114; 34/134
[58] Field of Search ................. 432/18, 31, 78, 83, 432/84, 107, 112, 114; 34/134, 119

[56] References Cited

U.S. PATENT DOCUMENTS

| | | | |
|---|---|---|---|
| 1,052,660 | 2/1913 | Geiber | 34/134 |
| 1,571,076 | 1/1926 | Warren | 34/134 |
| 1,573,144 | 2/1926 | Credo | 34/134 |
| 2,213,667 | 9/1940 | Dundas et al. | 34/134 |
| 2,283,129 | 5/1942 | Roubal | 432/84 |
| 3,039,753 | 6/1962 | Eketorp et al. | 432/18 |
| 3,294,384 | 12/1966 | Hollefriend | 432/127 |
| 3,313,534 | 4/1967 | Frans | 432/78 |
| 3,782,888 | 1/1974 | Cnare | 432/18 |
| 3,920,380 | 11/1975 | Heian | 432/78 |
| 4,376,343 | 3/1983 | White et al. | 432/112 |

Primary Examiner—Henry C. Yuen
Attorney, Agent, or Firm—McGlew and Tuttle

[57] ABSTRACT

A method and apparatus is disclosed for indirectly drying and preheating fine material, in particular, moisture containing coal or the like, comprises, providing a rotary drum which is mounted for rotation and has a plurality of heating tubes extending therethrough, supplying heated cooling gas from a dry coke cooling system to the heating tubes, supplying the moist material to the drum, adjacent the bottom thereof, removing the material from the drum after it has been predried and preheated, and returning or recycling a portion of the predried and preheated material to the rotary drum. The method and apparatus utilizes the heated cooling gas used to cool dry coke in a dry coke cooling plant from high temperatures to below 200° C. It has been found that such heated cooling gas for a selected amount of dry coke is useful either in a series of more than one rotary drum or, to process moist material in a single rotary drum and also generate steam as a byproduct.

6 Claims, 4 Drawing Figures

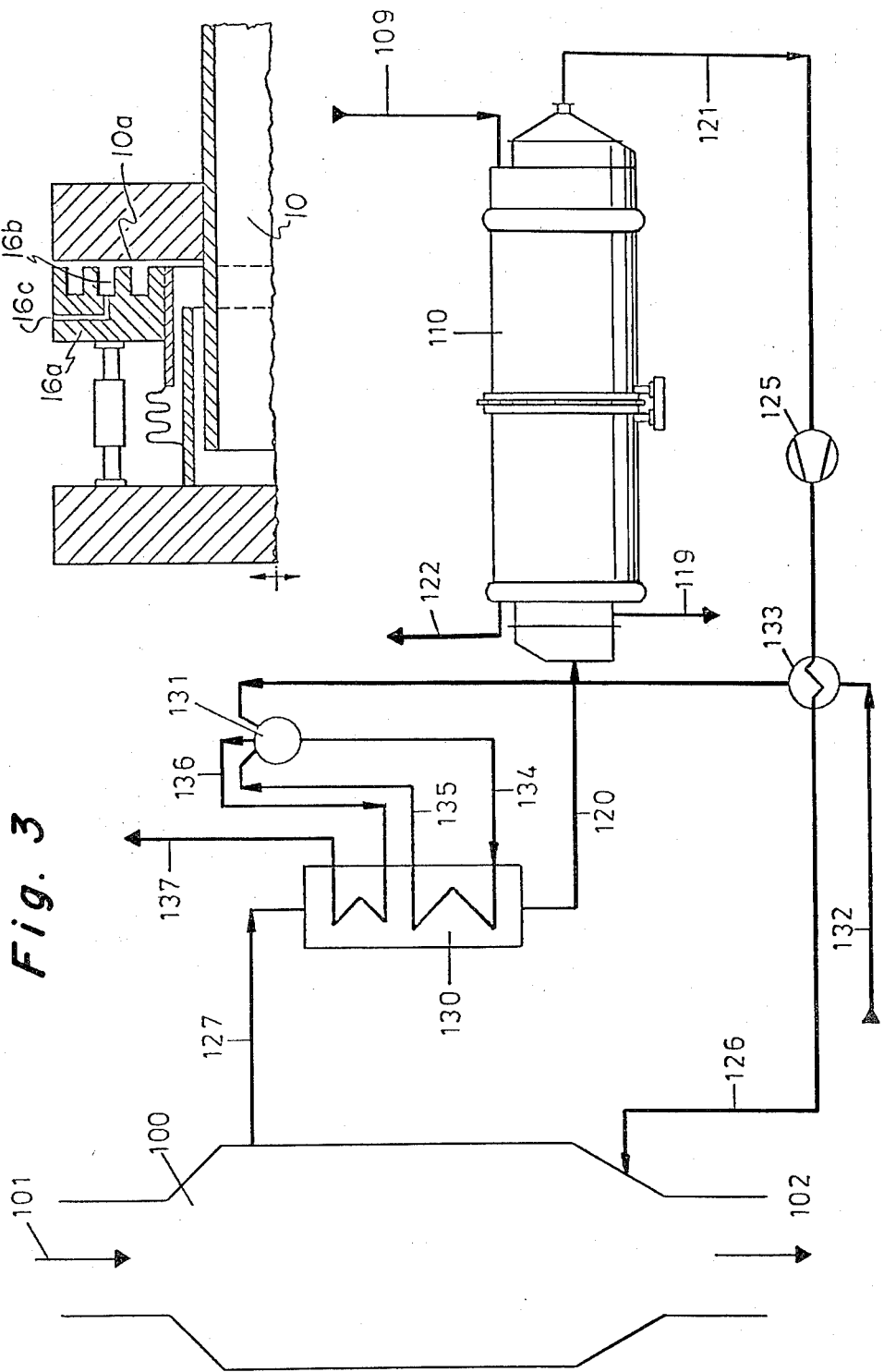

METHOD AND APPARATUS FOR INDIRECTLY DRYING AND PREHEATING FINE MATERIAL

This is a division of application Ser. No. 295,496 filed Aug. 24, 1981, U.S. Pat. No. 4,392,823.

FIELD AND BACKGROUND OF THE INVENTION

The present invention relates to the drying of moist material in general, such as, bituminous and sub-bituminous coal, peat, wood, oil shale, ores, limestone and the like and, in particular, to a new and useful method and apparatus for preheating and drying such moist material using a rotary drum having heating tubes therethrough which are supplied with heated cooling gas from a dry coke cooling plant.

A coal mud drier is known from German Offenlegungsscrift No. 28 44 075, which is equipped with a hot gas drying system in a rotary drier furnace, in which a number of tubes is rigidly mounted in the longitudinal direction of the rotary drum of the furnace. Heating gases are continuously circulated through these tubes while waste gases, predominantly only enriched with steam, escape from the interior of the drum into the open atmosphere. To produce the heating gases, a separate burner is needed which must be operated with rich gases.

Such rotary drum driers are mostly disposed with a slight inclination and the moist fine material is fed in at the highest point of the drum while the preheated material is discharged at the lowest point. Proper structures are provided on the inside surface of the rotary drum by which the drying material migrating down between the heating tubes of the nests and accumulating on the drum bottom is lifted by the rotation of the drum and dropped again from above on the tube nests. With the slight inclination of the rotary drum, the fine material fed in at one end gradually passes to the other end where it is discharged. During its travel from the higher to the lower end, the fine material is repeatedly raised to the tube nests to flow down between the tubes and be dried and preheated.

To insure a trouble-free operation of such rotary drum driers, certain minimum requirements must be imposed on the charged material. For example, while drying coal, the moisture content of the charged coal must not affect the fluidity of the material charged to the tube nests. Otherwise, congestions and deposits of coal between the tubes and thus a reduced efficiency of the drier can be expected. In such cases, a remedy may be to enlarge the spacing between the tubes, for example, from 20 mm to 40 mm. However, this substantially reduces the heat exchange surface areas and thus again the efficiency of the drier. What is to be sought is rather to enlarge the heat exchange surface area by reducing the clearances for the passage of the fine material and thus to increase the drier efficiency. This particularly applies to the design of driers with a high throughput capacity.

Further difficulties arise during the operation of such drum driers with the removal of the produced vapors.

In these driers, the vapors are taken off toward the discharge end of the rotary drum through an opening in the top portion above the heating tube nest. Since for constructional reasons, this opening cannot be too large, the produced vapors entrain much fine dust and an expensive dust separation must be provided outside the rotary drier.

SUMMARY OF THE INVENTION

The present invention is directed to an economical method of indirect drying and preheating of fine material, requiring no burning of rich gases, and improving the operation and increasing the efficiency of the indirectly heated drum drier by insuring a uniform and trouble-free passage of the fine material therethrough and improving the evacuation of vapors.

Accordingly, an object of the present invention is to provide a method of indirectly drying and preheating fine material, such as bituminous and sub-bituminous coal, peat, wood, oil shale, ores or limestone, in which the fine material is dried and preheated by means of heating tubes through which gases are continuously circulated, and including conducting heated cooling gas from a dry coke cooling system, after dust has been separated from such heated cooling gas, as heating gas through the heating tubes of a rotary drum drier, and recycling a portion of the preheated and dried fine material to the rotary drum.

While applying these inventive operating steps, it has been found that, surprisingly, the heat absorbed during the dry coke cooling process by the circulating gases is sufficient, in every instance, for drying the coal and preheating it to about 200° C. An excess heat of about 50% even remains as a balance.

Another object of the invention is to provide such a method wherein the heated cooling gas from the dry coke cooling system is initially cooled to between 500° C. and 600° C. in a steam generator, before the heated cooling gas is supplied to the heating tubes of the drier.

This preliminary cooling of the gases is particularly beneficial to the material of the heating tubes. Also, it favors steam generation, if the feed water from the secondary cooler which is provided upstream of the location where the cooling gases enter the dry coke cooling system, is supplied directly to the steam generator.

In cases where the dry coke cooling system is designed almost entirely for steam generation, it has proved particularly advantageous to conduct the steam produced during the cooling of coke in a dry coke cooling plant through the heating tubes of the rotary drum drier.

In this connection, it may be particularly economical to employ pressure steam pipes for the tube nests. This further calls for using, for the coal drying, a steam produced during the dry coke cooling. In such a case, of course, the equipment for circulating and controlling the heating gases is omitted. Only a steam supply line and a condensate drain are needed, and the drying process will be controlled in a simple way by the temperature of the steam.

A still further object of the invention is to provide an apparatus for carrying out the method which comprises an outer rotary drum having a plurality of heating tubes in heating tube nests extending therethrough, feed and discharge mechanisms for moist and preheated fine material provided at a front side end of the drum, and devices for taking dried vapors from the drum, wherein, the discharge mechanism for the preheated and dried material is connected, at a location outside the rotary drum, to a return line for initially providing such moist material to the rotary drum through a feed mechanism.

The inventive design makes it possible to mix any adjustable amount of preheated fine material outside the rotary drum drier proper with the charged moist material and to dry and preheat the moist and cold charge by direct heat exchange between solid and solid.

An evaporation bin having an offtake for vapors and equipped with a mixing screw for the moist and the preheated fine material is provided upstream of the feed mechanism.

The inventive evaporation bin makes it possible to evacuate substantial amounts of water vapor already prior to feeding the material to the rotary drum, so that the amount of vapors to be removed from the rotary drum is reduced. In consequence, the amount of dust entrained from the rotary drum drier with the residual vapors is also less, as compared to the prior art methods.

The invention further provides a feed mechanism designed as a screw conveyor extending into the lower zone of the rotary drum at one front or upstream side thereof. It is particularly advantageous if the feed mechanism projects into the rotary drum below the stationary heating tubes, unlike the prior art which supplies the material from above.

Due to such a provision, the coal fed in, mixes with the predried coal which has already passed once or several times from above, between the tubes to the bottom of the drum, before it is raised for the first time to the heating tube nest above. Congestions by deposits of coal between the tubes are thereby avoided and the product can travel through the rotary drum driver without trouble.

As to the relocation of the feed mechanism into the lower zone of the drum, it is advantageous to provide offtakes for the drier vapors at each of the front sides or ends of the drum, in the upper zone of the rotary drum above the heating tube nest. While in the prior art, the moist material has been fed in at one front side, in the upper zone of the rotary drum and the vapors could be evacuated only at the opposite side, the inventive evacuation of vapors at both sides offers the advantage that the speed at which the produced vapors are taken off is reduced to one-half so that less dust is also entrained.

Since the fluidity of the material to be dried gradually increases in the travel direction thereof and the possibility of congestions decreases accordingly toward the discharge end, it is provided, in accordance with the invention, that the diameter of the tubes of the heating tube nests increases stepwise in the direction of travel of the drying material within the rotary drum. It is further advantageous to reduce the diameter of the tubes only in the zone where the fine material is fed into the rotary drum initially.

As to the design of the tube nests, the invention provides, in addition, a hair pin construction, with the tubes of the nest projecting into the rotary drum from the two stationary drum heads. This design is also favorable in that it makes it possible to provide, in the rotary drum, a larger number of tubes and reduced spacing at the side where the preheated fine material is discharged, than at the feed side.

To seal the rotary drum against the stationary drum heads, the invention provides that the seals between the drum and the heads include a smooth ring surface on the rotating side, and a unilateral labyrinth gland on the opposite, stationary side. Advantageously, a ring conduit is provided in a recess of the labyrinth gland, for supplying a sealing gas. While in the prior art, the seal between the rotary part of the drum and the stationary housing has been designed as a simple sliding seal, metal on metal, the invention provides a unilateral labyrinth gland and a supply of a sealing gas, advantageously superheated steam.

The inventive design, unlike with a simple sliding seal, makes it possible to substantially reduce the contact pressure and thus the friction losses. The sealing gas flowing toward the interior of the drum insures, in addition, that no coal dust can deposit in the seal gap.

Further, the seals may be pressed into contact with the drum through hydraulically operated cylinders provided at the periphery, and the contact pressure may automatically be kept constant through the hydraulic system. In this way, even a low contact pressure can be kept constant and still some wobble of the drum and longitudinal dilatation due to greater temperature variations, for example, are compensated for.

In certain cases, it has proved advantageous in the construction and operation of the rotary drum drier, instead of an immovable mounting of the heating tube nests on the drum heads, to mount the nests for rotation through a separate drive, in the direction of the drum rotation, or opposite thereto.

This primarily reduces the risk of congestion and coal deposits between the tubes. Also, the coal may remain longer at the heating tubes, so that more favorable conditions are created for the convective heat transfer from the heating surfaces to the coal.

In accordance with the invention, with the same direction of rotation, it is advisable to provide a double to fourfold speed of the drum, relative to the inside heating tube nest.

Another object of the invention is to provide such a device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 3 is a view similar to FIG. 2 of another embodiment of the invention; and

FIG. 4 is a side fragmentary sectional view, partially in elevation, of a labyrinth seal, used in the apparatus of the invention.

DESCRIPTION OF THE PREFERRED EMBODIMENTS

Figure 1:
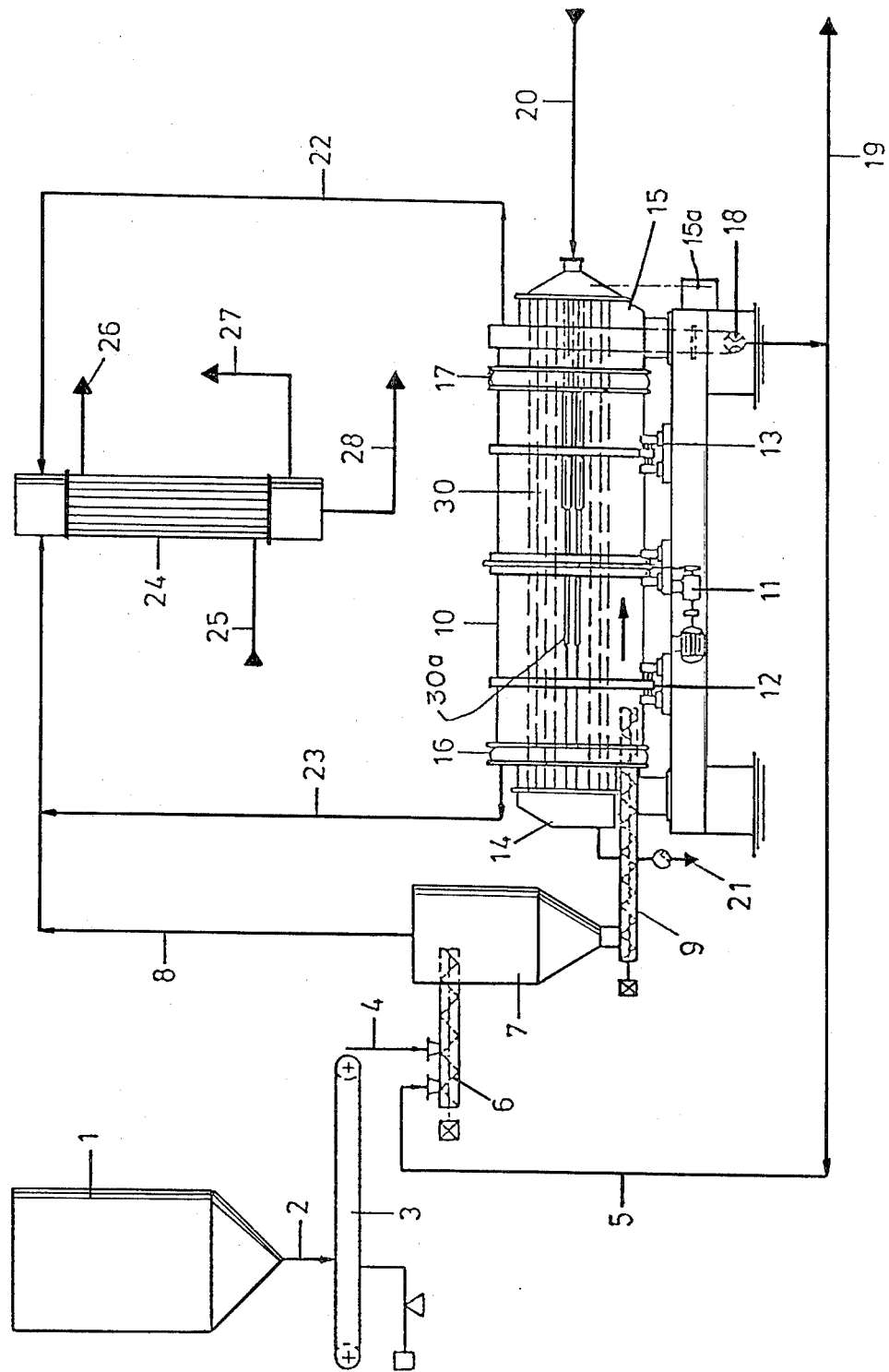
FIG. 1 is a diagrammatical illustration of a system and apparatus according to the invention for practicing the inventive method.

Turning to the drawings in particular, the invention embodied therein in FIG. 1, shows a bin 1 for the moist fine material to be dried, which is connected, through an outlet 2, a conveyor-type weigher 3, and a delivery means 4, to a mixing screw 6 and an evaporation bin 7. Beneath the evaporation bin 7, a screw conveyor 9 is provided projecting into a rotary drum 10 from the front side thereof, below a nest 30 of heating tubes.

Mixing screw 6, in addition to being connected to the moist coal supply 1 to 4, is also connected to the discharge lock 18 of rotary drum 10 through a return line 5. Return line 5 is embodied, for example, by enclosed screw conveyors or chain conveyors, known per se.

The movable parts of rotary drum 10 are associated with a drive 11 and two bearings 12 and 13, while the two drum heads 14 and 15 are stationary or rotatable and are sealed against rotary drum 10 by means of seals 16 and 17.

Heating tube nests 30 are fixedly anchored to drum heads 14 and 15 and extend through the drum in the axial direction thereof, from one drum head to the other. For this purpose, the heads 14 and 15 are fixed and the heating tube nests 30 are either fixed, or mechanically connected to a schematically shown drive means 15a for rotating, to achieve the relative motion between the tubes and the rotary drum 10.

Turning to FIG. 4, the labyrinth seal is shown which comprises a unilateral labyrinth 16a which defines at least one ring-shaped chamber 16b which can be supplied with fluid, such as steam, through an opening 16c. The labyrinth seal cooperates with a smooth surface 10a of drum 10.

As shown in FIG. 1, at least one of the heating tubes 30a increases in diameter, in stepwise fashion, along the travel direction shown by the arrow in rotary drum 10. In particular, tube 30a may increase by a single step from a small diameter portion connected to the head 14, and adjacent the moist material inlet mechanism 9.

The heating fluid, which is superheated steam as a rule, is conducted through a connection 20 to drum head 15 and therefrom into the interior of heating tubes 30. A condensate drain 21 is provided at the opposite head 14.

To evacuate the vapors produced during the drying process, vapor offtakes 22 and 23 are provided above heating tube nests 30, at both front sides of rotary drum 10, which are connected to a cooler 24.

The vapors which have already been produced in evaporation bin 7 are also directed to cooler 24 through a line 8. The cooler has connections 25 and 26 for supplying and discharging cooling water, and a condensate drain line 28 for the water from the process of drying.

A connection 27 makes it possible to vent cooler 24, or to take off gases therefrom by suction.

EXAMPLE OF OPERATION OF A ROTARY DRUM DRIER

As shown in FIG. 1, 80 ton/hour of fine coal having a moisture content of 12%, are delivered from moist coal bin 1 for drying. In mixing screw 6, this moist coal is also mixed with 80 t/h of already dried coal which has been preheated to 200° C., and the mixture is supplied into evaporation bin 7. With an average mixture temperature of about 75° C., approximately 2.7 t/h of vapors escape from bin 7, and they are conducted to indirect cooler 24. An amount of 157.5 t/h of coal is thus fed into the rotary drum by screw conveyor 9, having a moisture content of about 4.4%.

While with a moisture content of 12% of the fine coal, congestion, clogging and trouble may very easily occur in bins and conveying means due to poor fluidity, such problems hardly arise any longer with a coal having a moisture content of less than 5%. Not even at an unfavorable range of the grain sizes. If such a coal is, in addition, continuously mixed in the rotary drum with the coal which has already once passed by the heating tubes, it is ensured that the coal mixture charged from above onto the heating tube nests will flow down between the tubes without problems.

During drying in the rotary drum 10, further about 6.9 t/h of water vapor escapes from the coal mixture and are directed to the cooler, so that at the end of the drum, about 150.4 t/h of preheated coal are discharged having a temperature of approximately 200° C., of which 80 t/h are recycled by conveying means 5 to mixing screw 6, and 70.4 t/h are removed through discharge line 19 to be supplied by a suitable means of transportation, to the coke ovens.

Figure 2:
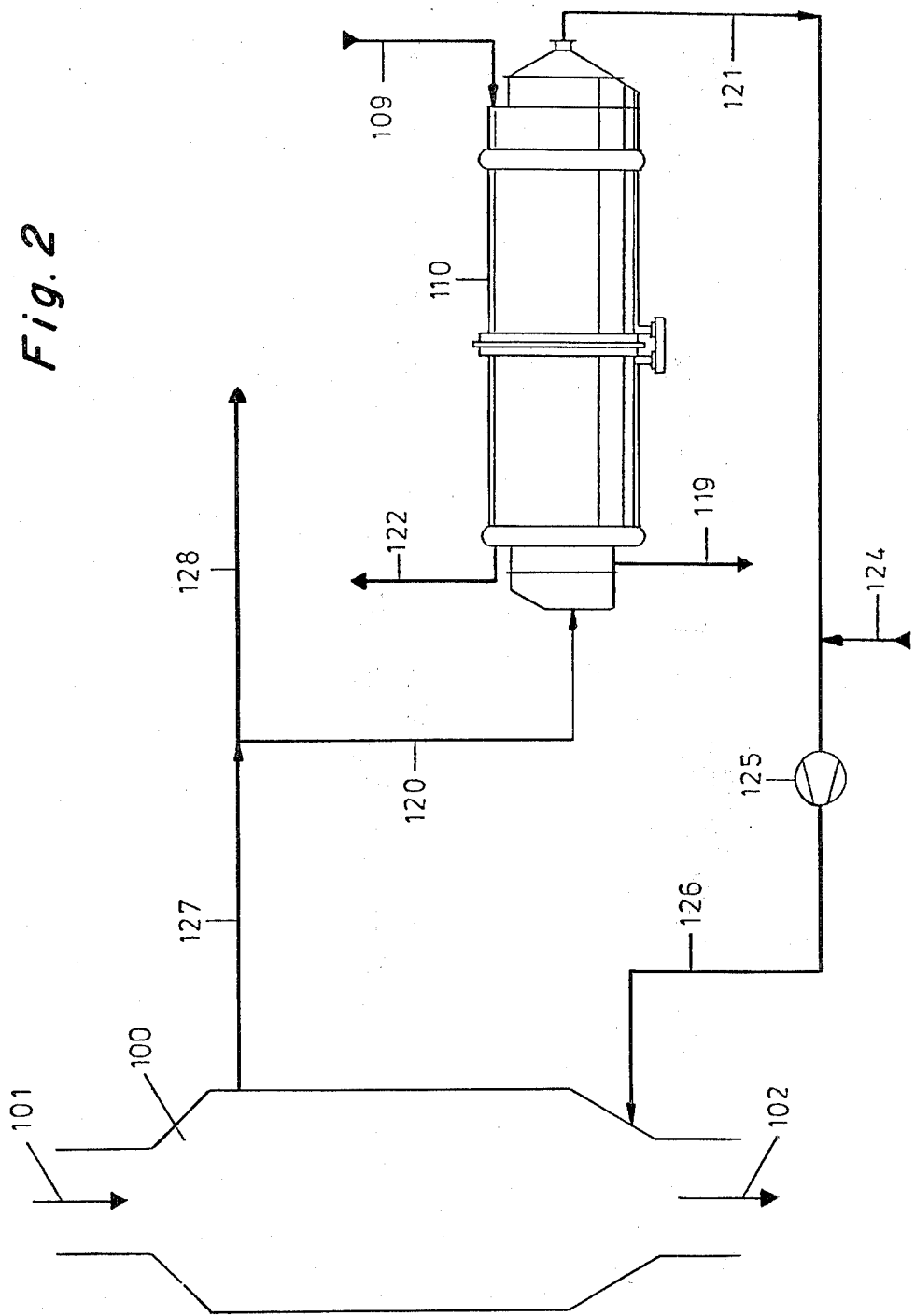
FIG. 2 is a diagrammatical illustration of an apparatus for practicing the invention which combines a rotary drum drier with a dry coke cooling system.

Other examples of the invention are illustrated in FIGS. 2 and 3. In these figures, a dry coke cooling plant or system is shown at 100 for the entry of hot coke at 101 and the withdrawal of the cooled coke at 102.

FIG. 2 shows a system whereby a plurality of rotary drums 110 can be serviced by the heated cooling gases of a single coke cooler plant 100. In FIG. 3, a single rotary drum 110 is provided with gas, with a remainder of the heat in the heated cooling gas being utilized for generating steam in a steam generator 130.

The following listing of elements and their corresponding reference numerals are provided for easy understanding of the systems illustrated in FIGS. 2 and 3. All elements are the same for both embodiments except where indicated to be specific to either FIG. 2 or FIG. 3 alone.

100—dry coke cooler plant
101—entrance hot coke
102—exit cooled coke
109—entrance moist coal
119—exit preheated coal
110—rotary drum drier
120—entrance hot gas
121—exit hot gas (to become cooling gas for 100)
122—exit vapors
127—hot cooling gas from the dry coke cooler
128—entrance hot gas for a second drier (not shown) connected in parallel (FIG. 2)
124—cooling gas from second drier (FIG. 2)
125—blower for cooling gas
126—return of cooling gas to dry coke cooler
130—steam generator (FIG. 3)
131—steam cylinder (FIG. 3)
132—feedwater supply secondary cooler (FIG. 3)
133—secondary cooler (FIG. 3)
134 to
137—steam circulation (FIG. 3)

The following table illustrates the operation of the apparatus shown in FIGS. 2 and 3, respectively, keyed into reference numerals of these figures.

TABLE

| | (Amounts shown PER HOUR) | |
|---|---|---|
| REF. NUMBER | FIG. 2 | FIG. 3 |
| | Coke | Coke |
| 101 | 60 t | 60 t |
| | $t_1 = 1050°$ C. | $t_1 = 1050°$ C. |
| 102 | $t_2$ 200° C. | $t_2$ 200° C. |
| | Cooling Gas | Cooling Gas |
| 127 | 95,000 $m_n^3$ | 95,000 $m_n^3$ |
| | $t_1 = 750°$ C. | $t_1 = 750°$ C. |
| 126 | $t_2 = 150°$ C. | $t_2 = 150°$ C. |
| 120/128 | 47,500 $m_n^2$ | 95,000 $m_n^3$ |
| | Coal per Drier | Coal |
| 109 | 80 t | 90 t |
| | $t_1 =$ ca. 10° C. | $t_1 =$ ca. 10° C. |
| | 10% moisture | 10% moisture |
| 119 | 72 t | 81 t |

TABLE-continued

| | (Amounts shown PER HOUR) | |
|---|---|---|
| REF. NUMBER | FIG. 2 | FIG. 3 |
| | $t_2 = 220°$ C. Vapors | $t_2 = 220°$ C. Vapors |
| 122 | 8 t each drier | 9 t Steam |
| 137 | | ca. 14.5 t $p = 13$ bar $t = 320°$ C. |

The examples to FIGS. 2 and 3 show that it is possible, by means of the heat amounts removed from the dry coke cooler 100, to operate simultaneously two rotary drum driers connected in parallel, as indicated in FIG. 2. As is evident from example or FIG. 2, while cooling 60 t of coke from 1,050° C. to less than 200° C., it would be possible to preheat about 160 t of coal to 200° C. This is practicable if, in a cooling plant, only a part of the coke production is cooled in such a dry coke cooler.

In the case shown in FIG. 3, the 90 t of coal to be preheated are an adequate amount for producing 60 t of coke. The excess heat from the cooler is used for generating steam in excess in generator 130.

It should be further noted that the inventive solution shown in FIG. 2, with the supply of the hot cooling gases from the dry coke cooler into preheating tubes of the rotary drum drier, is the most simple and inexpensive one, since no additional heat exchanger is needed for the steam generation. Should the dry coke cooler and the coal drying plant be provided at locations which are widely spaced apart, it may be more advantageous to first generate steam indirectly, and then to supply this steam into the heating tubes of the drier, since over larger distances, the transportation of this steam in pipes of relatively smaller diameter is simpler than the supply of the hot cooling gases through pipes having a very large diameter.

While specific embodiments of the invention have been shown and described in detail to illustrate the application of the principles of the invention, it will be understood that the invention may be embodied otherwise without departing from such principles.

What is claimed is:

1. A method of indirectly drying and preheating fine material, comprising:
    providing a rotary drum having a plurality of heating tubes extending therethrough;
    supplying heated cooling gases from a dry coke cooling system, from which dust has been separated, to the heating tubes;
    feeding the fine material to be dried and preheated to the rotary drum for preheating and drying the fine material;
    removing the dried and preheated fine material from the rotary drum; and
    recycling a portion of the dried and preheated material to the rotary drum.

2. A method, according to claim 1, comprising, initially cooling the heated cooling gases from the dry coke cooling system in a steam generator, to a temperature of between about 500° C. and 600° C., and thereafter, directing the cooling gases to the heating tubes.

3. A method, according to claim 1, including producing steam from the heat of the heated cooling gases of the dry coke cooling plant and directing the thus produced steam through the heating tubes.

4. A method, according to claim 1, including rotating the heating tubes in the rotary drum in the same direction as a rotation of the rotary drum but at a speed between one-half and one-quarter that of the rotary drum.

5. A method, according to claim 1, including rotating the heating tubes in a direction opposite the rotation of the rotary drum.

6. A method, according to claim 1, including maintaining the heating tubes in a fixed position with respect to the rotation of the rotary drum.

* * * * *

UNITED STATES PATENT OFFICE
CERTIFICATE OF CORRECTION

Patent No. 4,422,846      Dated December 27, 1983

Inventor(s) Weber et al

It is certified that error appears in the above-identified patent and that said Letters Patent are hereby corrected as shown below:

In heading on first page, section (73) reads:

"(73) Assignee: Firma Carl Still GmbH & Co. KG,
              Japan"

whereas this section should read as follows:

--(73) Assignee: Firma Carl Still GmbH & Co. KG,
              Recklinghausen, West Germany

Signed and Sealed this

Twentieth Day of March 1984

[SEAL]

*Attest:*

*Attesting Officer*

GERALD J. MOSSINGHOFF

*Commissioner of Patents and Trademarks*